United States Patent
Ur Rehman et al.

(10) Patent No.: US 11,771,103 B2
(45) Date of Patent: Oct. 3, 2023

(54) PRODUCTION AND SEPARATION OF MILK FRACTIONS WITH FORWARD OSMOSIS

(71) Applicant: fairlife, LLC, Chicago, IL (US)

(72) Inventors: Shakeel Ur Rehman, Naperville, IL (US); Timothy P. Doelman, Glencoe, IL (US); Michael J. McCloskey, Dorado, PR (US); Keely O'Brien, Woodbury, TN (US)

(73) Assignee: fairlife, LLC, Chicago, IL (US)

( * ) Notice: Subject to any disclaimer, the term of this patent is extended or adjusted under 35 U.S.C. 154(b) by 241 days.

(21) Appl. No.: 17/254,989

(22) PCT Filed: Jun. 20, 2019

(86) PCT No.: PCT/US2019/038227
§ 371 (c)(1),
(2) Date: Dec. 22, 2020

(87) PCT Pub. No.: WO2020/009804
PCT Pub. Date: Jan. 9, 2020

(65) Prior Publication Data
US 2021/0267227 A1    Sep. 2, 2021

Related U.S. Application Data

(60) Provisional application No. 62/693,480, filed on Jul. 3, 2018.

(51) Int. Cl.
*A23C 9/142*    (2006.01)
(52) U.S. Cl.
CPC .......... *A23C 9/1427* (2013.01); *A23C 9/1425* (2013.01)
(58) Field of Classification Search
CPC ............................ A23C 9/1427; A23C 9/1425
USPC ....................................................... 426/491
See application file for complete search history.

(56) References Cited

U.S. PATENT DOCUMENTS

| 7,169,428 B2 | 1/2007 | Dunker et al. |
| 9,510,606 B2 | 12/2016 | Ur-Rehman et al. |
| 9,538,770 B2 | 1/2017 | Ur-Rehman et al. |
| 10,080,372 B2 | 9/2018 | Kallioinen et al. |
| 2013/0309353 A1* | 11/2013 | Ur-Rehman ......... A23C 9/1238 426/42 |
| 2018/0153184 A1* | 6/2018 | Ur Rehman ......... A23C 9/1206 |
| 2019/0045805 A1 | 2/2019 | Ur-Rehman et al. |

FOREIGN PATENT DOCUMENTS

| EP | 2 675 281 B1 | 4/2015 |
| WO | WO 2010/023362 A2 | 3/2010 |
| WO | WO 2011/051557 A1 | 5/2011 |

OTHER PUBLICATIONS

Pal et al., Development and analysis of a sustainable technology in manufacturing acetic acid and whey protein from waste cheese whey, Journal of Cleaner Production 112 (2016) 59e70. (Year: 2016).*
Hasanoglu et al., Concentration of Skim Milk and Dairy Products by Forward Osmosis, JOTCSB. 2017; 1(1): 149-160. (Year: 2017).*
International Search Report and Written Opinion of the International Searching Authority for International Patent Application No. PCT/US2019/038227 dated Sep. 9, 2019, 19 pages.
Babu, B.R. et al., "Effect of process parameters on transmembrane flux during direct osmosis", Journal of Membrane Science, 280(1-2): 185-194 (Sep. 2006).
Dabaghian, Z., "Draw solutions and their recovery methods for dairy and food industries—a brief overview", www.forwardosmosistech.com, 1-16 (Jun. 2018); retrieved from the Internet: https://www/forwardosmosistech.com/draw-solutions-and-their-recovery-methods-for-dairy-and-food-industries-a-brief-overview/.
Hasanoglu, A. et al., "Concentration of Skim Milk and Dairy Products by Forward Osmosis", JOTCSB, 1(1): 149-160 (2017).
Haupt, A. et al., "Forward Osmosis Application in Manufacturing Industries: A Short Review", Membranes, 8(47): 1-33 (2018).
Moraru, C., "Use of forward osmosis as a non-thermal method of concentration for the manufacture of high quality milk concentrates and powders", Journal of Dairy Scienc, 101(2): 376 (2018).
Pal, P. et al., "Development and analysis of a sustainable technology in manufacturing acetic acid and whey protein from waste cheese whey", Journal of Cleaner Production, 112: 59-70 (Jul. 2015).
Westerling, K., "Forward Osmosis: How It Works, And Why It's Important", www.wateronline.com; 1-2 (Mar. 2014); retrieved from the Internet: https://web.archive.org/web/20140413004408/https://www.wateronline.com/doc/forward-osmosis-how-it-works-and-why-it-s-important-0001.

* cited by examiner

*Primary Examiner* — Brent T O'Hern
(74) *Attorney, Agent, or Firm* — Merchant & Gould P.C.

(57) ABSTRACT

Disclosed are methods for preparing dairy compositions using an ultrafiltration step, a nanofiltration step, and a forward osmosis step.

26 Claims, 1 Drawing Sheet

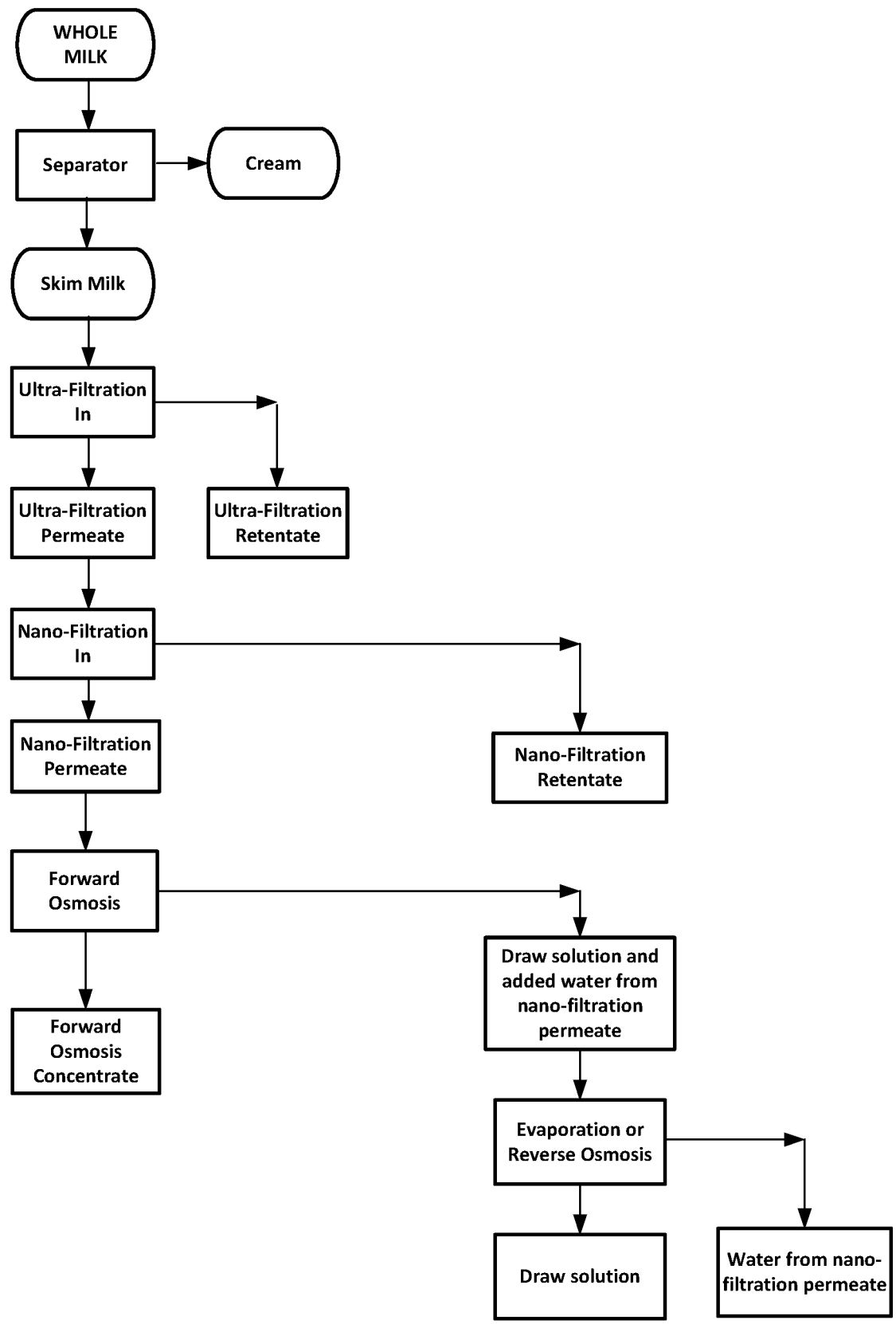

PRODUCTION AND SEPARATION OF MILK FRACTIONS WITH FORWARD OSMOSIS

REFERENCE TO RELATED APPLICATION APPLICATIONS

This application is a National Stage Application of PCT/US2019/038227, filed on Jun. 20, 2019, which claims priority to U.S. Provisional Patent Application No. 62/693,480, filed on Jul. 3, 2018, the disclosures of which are incorporated herein by reference in their entirety. To the extent appropriate, a claim of priority is made to the above disclosed applications.

BACKGROUND OF THE INVENTION

The present invention relates generally to separating a milk product into protein, fat, carbohydrate, and mineral components using combinations of ultrafiltration, nanofiltration, and forward osmosis techniques. Also encompassed are dairy compositions produced by mixing the milk components in various combinations and proportions.

Membrane filtration processes are non-thermal fractionation and concentration technologies for fluids. When a fluid is passed through a semi-permeable membrane under pressure, the components that get retained on the surface of the membranes are called retentates or concentrates, while the materials that pass through the membrane are collectively called the permeate. Membrane technologies generally do not involve heat or chemicals for fractionation or concentration, and therefore do not adversely affect the properties of the fluid, which is beneficial for milk and its components. When fluids like milk are fractionated by these membrane technologies, typically proteins do not get denatured, enzymes do not get inactivated, vitamins are not destroyed, and reactions between proteins and sugars do not occur.

SUMMARY OF THE INVENTION

This summary is provided to introduce a selection of concepts in a simplified form that are further described herein. This summary is not intended to identify required or essential features of the claimed subject matter. Nor is this summary intended to be used to limit the scope of the claimed subject matter.

Consistent with embodiments of this invention, a method for making a dairy composition is disclosed. This method can comprise (i) ultrafiltering a milk product to produce a UF permeate fraction and a UF retentate fraction, (ii) nanofiltering the UF permeate fraction to produce a NF permeate fraction and a NF retentate fraction, (iii) subjecting the NF permeate fraction to a forward osmosis step to produce a mineral concentrate, and (iv) combining at least two of the UF retentate fraction, the mineral concentrate, water, and a fat-rich fraction to form the dairy composition. Optionally, in step (iii), water can be removed from the NF permeate fraction in the forward osmosis step to form a diluted draw solution.

In one embodiment, the combining step can comprise combining at least the UF retentate fraction and the mineral concentrate, while in another embodiment, the combining step can comprise combining at least the fat-rich fraction, the UF retentate fraction, and the mineral concentrate. In these and other embodiments, water also can be added in the combining step to form the dairy composition.

Beneficially, and unexpectedly, the forward osmosis step can produce from the NF permeate fraction, at low operating temperatures and pressures, a mineral concentrate with very high mineral and solids contents, in some cases an order of magnitude greater than what can be achieved using traditional reverse osmosis techniques.

Both the foregoing summary and the following detailed description provide examples and are explanatory only. Accordingly, the foregoing summary and the following detailed description should not be considered to be restrictive. Further, features or variations can be provided in addition to those set forth herein. For example, certain embodiments can be directed to various feature combinations and sub-combinations described in the detailed description.

BRIEF DESCRIPTION OF THE FIGURE

FIG. 1 presents a schematic flow diagram of a separations process consistent with embodiments of this invention, which utilizes forward osmosis.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition can be applied. To the extent that any definition or usage provided by any document incorporated herein by reference conflicts with the definition or usage provided herein, the definition or usage provided herein controls.

Herein, features of the subject matter are described such that, within particular aspects and/or embodiments, a combination of different features can be envisioned. For each and every aspect, and/or embodiment, and/or feature disclosed herein, all combinations that do not detrimentally affect the designs, compositions, processes, and/or methods described herein are contemplated with or without explicit description of the particular combination. Additionally, unless explicitly recited otherwise, any aspect, and/or embodiment, and/or feature disclosed herein can be combined to describe inventive designs, compositions, processes, and/or methods consistent with the present invention.

In this disclosure, while compositions and methods are often described in terms of "comprising" various components or steps, the compositions and methods can also "consist essentially of" or "consist of" the various components or steps, unless stated otherwise. For example, a dairy composition consistent with embodiments of the present invention can comprise; alternatively, can consist essentially of; or alternatively, can consist of; a fat-rich fraction, a UF retentate fraction, water, and a mineral concentrate.

The terms "a," "an," and "the" are intended to include plural alternatives, e.g., at least one, unless otherwise specified. For instance, the disclosure of "an ingredient" and "an additional milk fraction" are meant to encompass one, or mixtures or combinations of more than one, ingredient and additional milk fraction, unless otherwise specified.

In the disclosed methods, the term "combining" encompasses the contacting or addition of components in any order, in any manner, and for any length of time, unless otherwise specified. For example, the components can be combined by blending or mixing.

The "lactose fraction" is meant to encompass a milk component fraction that is rich in lactose or any derivatives thereof, e.g., hydrolyzed, un-hydrolyzed, epimerized, isomerized, or converted to oligosaccharides, as would be recognized by one of skill in the art. Moreover, unless stated otherwise, this term also is meant to encompass glucose/galactose, such as may be produced by the treatment of lactose with lactase enzyme.

Although any methods and materials similar or equivalent to those described herein can be used in the practice or testing of the invention, the typical methods and materials are herein described.

Various numerical ranges are disclosed herein. When a range of any type is disclosed or claimed herein, the intent is to disclose or claim individually each possible number that such a range could reasonably encompass, including end points of the range as well as any sub-ranges and combinations of sub-ranges encompassed therein, unless otherwise specified. As a representative example, the present application discloses that a UF retentate fraction can have, in certain embodiments, from about 9 to about 15 wt. % protein. By a disclosure that the protein content of the UF retentate fraction can be in a range from about 9 to about 15 wt. %, the intent is to recite that the protein content can be any amount within the range and, for example, can be equal to about 9, about 10, about 11, about 12, about 13, about 14, or about 15 wt. %. Additionally, the UF retentate fraction can contain an amount of protein within any range from about 9 to about 15 wt. % (for example, from about 10 to about 14 wt. %), and this also includes any combination of ranges between about 9 and about 15 wt. %. Further, in all instances, where "about" a particular value is disclosed, then that value itself is disclosed. Thus, the disclosure of a protein content from about 9 to about 15 wt. % also discloses a protein content from 9 to 15 wt. % (for example, from 10 to 14 wt. %), and this also includes any combination of ranges between 9 and 15 wt. %. Likewise, all other ranges disclosed herein should be interpreted in a manner similar to this example.

The term "about" means that amounts, sizes, formulations, parameters, and other quantities and characteristics are not and need not be exact, but may be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

Methods for making dairy compositions are disclosed and described herein. Such methods can utilize ultrafiltration, nanofiltration, and forward osmosis. Specifically, in these methods, the nanofiltration permeate (NF permeate) can be subjected to a forward osmosis step to produce a mineral concentrate.

In accordance with embodiments of this invention, methods for making a dairy composition can comprise (or consist essentially of, or consist of) (i) ultrafiltering a milk product to produce a UF permeate fraction and a UF retentate fraction, (ii) nanofiltering the UF permeate fraction to produce a NF permeate fraction and a NF retentate fraction, (iii) subjecting the NF permeate fraction to a forward osmosis step to produce a mineral concentrate, and (iv) combining at least two of the UF retentate fraction, the mineral concentrate, water, and a fat-rich fraction to form the dairy composition. In some embodiments, the combining step can comprise combining at least the UF retentate fraction and the mineral concentrate, while in other embodiments, the combining step can comprise combining at least the fat-rich fraction, the UF retentate fraction, and the mineral concentrate. Water also can be added in the combining step to form the dairy composition, thus the combining step can comprise combining the UF retentate fraction, water, and the mineral concentrate. Alternatively, the combining step can comprise combining the fat-rich fraction, the UF retentate fraction, water, and the mineral concentrate.

Generally, the features of these methods (e.g., the characteristics of the milk product, the ultrafiltering step and the resultant UF permeate fraction and UF retentate fraction, the nanofiltering step and the resultant NF permeate fraction and NF retentate fraction, the forward osmosis step and the resultant mineral concentrate, and the components that are combined to form the dairy composition, among others) are independently described herein and these features can be combined in any combination to further describe the disclosed methods. Moreover, other process steps can be conducted before, during, and/or after any of the steps listed in the disclosed methods, unless stated otherwise. Additionally, any dairy compositions (e.g., finished milk products, ready for consumption) produced in accordance with any of the disclosed methods are within the scope of this disclosure and are encompassed herein.

Filtration technologies (e.g., ultrafiltration, nanofiltration, forward osmosis, etc.) can separate or concentrate components in mixtures—such as milk—by passing the mixture through a membrane system (or selective barrier) under suitable conditions (e.g., pressure). The concentration/separation can be, therefore, based on molecular size. The stream that is retained by the membrane is called the retentate (or concentrate).

The milk product in step (i) can comprise (or consist essentially of, or consist of) skim milk, or alternatively, whole milk. In some embodiments, the method can further comprise a step of separating (e.g., centrifugally separating) a raw milk or fresh milk (whole milk) into the milk product (also referred to as skim milk) and a fat-rich fraction (also referred to as cream or butter fat). The raw milk or fresh milk (whole milk) can be cow's milk, which contains approximately 87 wt. % water, 3-4 wt. % protein, 4-5 wt. % carbohydrates/lactose, 3-4 wt. % fat, and 0.3-0.8 wt. % minerals. When the fresh or raw milk product is separated into the skim milk product and the fat-rich fraction, the fat-rich fraction typically contains high levels of fat (e.g., 20-50 wt. % fat, or 30-50 wt. % fat) and solids (e.g., 30-60 wt. %, or 40-55 wt. %), and often contains approximately 1.5-4 wt. % protein, 2-5 wt. % lactose, and 0.2-0.9 wt. % minerals, although not limited thereto.

In step (i), ultrafiltering of the milk product can be conducted using ultrafiltration membranes with pore sizes that typically are in the 1 to 100 nm range, or the 10 to 100 nm range. In the dairy industry, the ultrafiltration membranes often are identified based on molecular weight cut-off (MWCO), rather than pore size. The molecular weight cut-off for ultrafiltration membranes can vary from 1000-

100,000 Daltons, or from 10,000-100,000 Daltons. For instance, the milk product can be ultrafiltered using a polymeric membrane system (ceramic membranes also can be employed). The polymeric membrane system (or ceramic membrane system) can be configured with pore sizes such that the materials having molecular weights greater than about 1,000 Daltons, greater than about 5,000 Daltons, or greater than about 10,000 Daltons, are retained, while lower molecular weight species pass through. For instance, UF membrane systems with a molecular weight cut-off of 10,000 Daltons can be used in the dairy industry for separating and concentrating milk proteins. In some embodiments, the step of ultrafiltering utilizes a membrane system having pore sizes in a range from about 10 to about 100 nm, and operating pressures typically in the 15-150 psig range, or the 45-150 psig range. While not being limited thereto, the ultrafiltration step often can be conducted at a temperature in a range from about 5 to about 50° C.

In step (ii), the UF permeate fraction can be subjected to a nanofiltration step to produce a NF permeate fraction and a NF retentate fraction. Nanofiltration in the dairy industry typically uses membrane elements that retain particles with molecular weights above approximately 100-300 Da. Nanofiltration is a pressure driven process in which the liquid is forced through a membrane under pressure, and materials having a molecular weight greater than the specified cut-off are retained, while smaller particles pass though the membrane pores. For generally separating lactose from minerals in a UF permeate stream, a pore size can be selected for maximum retention of lactose. Like ultrafiltration, nanofiltration can simultaneously perform both concentration and separation.

Nanofiltering of the UF permeate fraction can be conducted using nanofiltration membranes with pore sizes that typically are in the 0.001 to 0.01 micron range, for example, pore sizes in a range from about 0.001 to about 0.008 μm. In some embodiments, the step of nanofiltration utilizes a membrane system having pore sizes in a range from 0.001 to about 0.01 μm, with operating pressures typically in the 150-450 psig range, and operating temperatures ranging from about 10 to about 60° C. (or from about 15 to about 45° C.), although not limited thereto.

In step (iii), the NF permeate fraction can be subjected to a forward osmosis step to produce a mineral concentrate. Additionally, water can be removed from the NF permeate fraction in the forward osmosis step to form a diluted draw solution. Forward osmosis is typically performed at much lower pressures (and uses less energy) than standard reverse osmosis, and utilizes a semi-permeable membrane system having pore sizes such that water passes through, while other materials (e.g., proteins, fats, lactose or other sugars, and minerals) do not. Operating pressures typically are less than about or equal to about 50 psig, less than or equal to about 30 psig, or less than or equal to about 5 psig. Illustrative and non-limiting ranges for the operating pressure of the forward osmosis step include from about 0 psig (atmospheric pressure) to about 50 psig, from about 0 psig to about 10 psig, from about 1 psig to about 50 psig, from about 1 psig to about 30 psig, from about 1 psig to about 10 psig, from about 10 psig to about 30 psig, from about 15 to about 25 psig, and the like.

While not being limited thereto, the forward osmosis step can be conducted at a temperature in a range from about 2 to about 50° C.; alternatively, from about 2 to about 15° C.; alternatively, from about 5 to about 50° C.; alternatively, from about 5 to about 25° C.; or alternatively, from about 5 to about 15° C. Also not being limited thereto, forward osmosis membrane systems have a molecular weight cutoff of much less than 100 Da and, therefore, components other than water can be concentrated in the forward osmosis process (e.g., minerals). Generally, forward osmosis comprises a membrane system having pore sizes of less than or equal to about 0.001 μm.

As compared to reverse osmosis, the forward osmosis step consistent with embodiments of this invention can efficiently achieve higher solids content and higher minerals content. Further, there is less fouling during forward osmosis, as compared to reverse osmosis, and fouling can be removed easily, resulting in lower costs and less downtime for membrane cleaning and replacement. Moreover, forward osmosis systems generally are smaller in size and footprint than reverse osmosis systems, so retrofitting in small or congested spaces can be achieved.

Any suitable draw solution that has a higher concentration of solutes or ions than the solution from which water is to be drawn through a semipermeable membrane can be used for the forward osmosis step. Generally, a solution containing a high concentration of monovalent ions can be used, such as sodium, potassium, chloride, and the like, as well as combinations thereof. Additionally or alternatively, the draw solution can contain a high concentration of any suitable sugar, representative examples of which can include sucrose, glucose, galactose, lactose, fructose, maltose, and the like, as well as combinations thereof. Additionally or alternatively, the draw solution can contain a high concentration of milk minerals, and the concentrated mineral solution can be derived from any suitable source. The concentration difference between a feed stream (e.g., the NF permeate) and the draw solution is used to remove water from the feed stream. Generally, forward osmosis removes water from a lower concentration solution (feed side) to a higher concentration solution (draw solution) by osmotic pressure, when there is a semipermeable membrane or barrier (e.g., a polymeric membrane) between the two solutions. Thus, minerals and other non-water components of the feed stream (e.g., the NF permeate) are concentrated in forward osmosis, resulting in the mineral concentrate described herein.

The mineral concentrate, after the forward osmosis step, can contain less than or equal to about 2 wt. % lactose, or less than or equal to about 1.5 wt. % lactose, and often at least about 0.25 wt. % lactose, or at least about 0.5 wt. % lactose, but is not limited thereto. Non-limiting examples of the protein content of the mineral concentrate include from about 0.1 to about 3 wt. % protein, from about 0.2 to about 2 wt. % protein, from about 0.2 to about 1 wt. % protein, and the like.

The mineral content of the mineral concentrate, surprisingly, can be very high, and typically falls within the range from about 1 wt. % minerals to about 30 wt. % minerals. For example, the mineral concentrate can contain from about 1.5 to about 20 wt. % minerals in one embodiment, from about 1.5 to about 9 wt. % minerals in another embodiment, from about 2 to about 8 wt. % minerals in yet another embodiment, and from about 5 to about 15 wt. % minerals in still another embodiment. As disclosed herein, mineral contents are quantified by the ash test.

Likewise, the solids content of the mineral concentrate, surprisingly, can be very high, and typically falls within the range from about 1 wt. % solids to about 35 wt. % solids. In one embodiment, for example, the mineral concentrate can contain from about 1.5 to about 25 wt. % solids, from about 1.5 to about 10 wt. % solids in another embodiment, from about 3 to about 10 wt. % solids in yet another embodiment, and from about 5 to about 15 wt. % solids in still another embodiment.

Unexpectedly, the forward osmosis step disclosed herein is a very effective technique for increasing the mineral content and solids content of the incoming feed stream, in this case, the NF permeate fraction. Concentration factors of at least about 3, at least about 5, at least about 10, at least about 15, and at least about 20, can be achieved via the forward osmosis step disclosed herein, and often, the concentration factor can be as much as 40, 50, or 75 in particular embodiments. These concentration factors are applicable to a wt. % solids basis, as well as to a wt. % minerals basis. For example, subjecting a NF permeate fraction having 0.1 wt. % minerals and 0.15 wt. % solids to forward osmosis, resulting in a mineral concentrate having 1.6 wt. % minerals and 3 wt. % solids, would translate to a concentration factor of 16 based on minerals and a concentration factor of 20 based on solids. Representative and non-limiting ranges for the concentration factor encompassed herein include from about 3 to about 100, from about 5 to about 100, from about 10 to about 75, from about 10 to about 50, from about 15 to about 50, and the like, and these concentration factors are applicable to a wt. % solids basis, as well as to a wt. % minerals basis.

Beneficially, the mineral concentrate (after forward osmosis in the methods disclosed herein) can have a wt. % solids content (or a wt. % minerals content) that is—unexpectedly—significantly greater than that of a wt. % solids content (or a wt. % minerals content) of a reverse osmosis retentate fraction (RO retentate fraction) obtained by subjecting an otherwise equivalent NF permeate fraction to a reverse osmosis step. Thus, replacing a reverse osmosis step with a forward osmosis step results in a retentate stream having much greater amounts of minerals and solids. For example, the wt. % solids content (or wt. % minerals content) of the mineral concentrate can be 2 times, 3 times, 4 times, or 5 times greater than (and often can range up to 10-15 times, or 15-20 times, or more, greater than) the corresponding wt. % solids content (or wt. % minerals content) of a RO retentate fraction obtained by subjecting an otherwise equivalent NF permeate fraction to a reverse osmosis step.

Optionally, the diluted draw solution resulting from forward osmosis can be subjected to a step of removing at least a portion of water from the diluted draw solution to form a draw solution. The draw solution can be re-used in the forward osmosis step. In one embodiment, removing at least a portion of water from the diluted draw solution can comprise subjecting the diluted draw solution to reverse osmosis. Reverse osmosis is a fine filtration process or concentration process in which substantially all components are retained (retentate) other than water, which passes through the reverse osmosis membrane. Often, reverse osmosis membrane systems have a molecular weight cutoff of much less than 100 Da and, therefore, components other than water are concentrated in the reverse osmosis process (e.g., minerals). Generally, reverse osmosis comprises a membrane system having pore sizes of less than or equal to about 0.001 µm. Operating pressures typically are in the 450-1500 psig, or 450-600 psig, range. Temperatures ranging from about 5 to about 45° C., or from about 15 to about 45° C., often can used.

Alternatively, removing at least a portion of water from the diluted draw solution can comprise subjecting the diluted draw solution to evaporation. While not limited thereto, temperatures of greater than 100° C. often are employed, as well as sub-atmospheric pressures. Whether evaporation or reverse osmosis, the resulting water fraction is substantially free of all of the milk components and draw solution components (from forward osmosis). Thus, the water fraction can be substantially all water, for instance, at least about 99 wt. % water, at least about 99.5 wt. % water, or at least about 99.8 wt. % water.

Step (iv) of the method of making a dairy composition comprises combining at least two of the UF retentate fraction, the mineral concentrate, water, and a fat-rich fraction to form the dairy composition. Any combinations of these components can be mixed or combined, in any suitable relative proportions, to form the dairy composition. Moreover, an ingredient and/or an additional milk fraction also can be added in the combining step. Additionally or alternatively, an ingredient and/or an additional milk fraction can be added to the dairy composition after the combining step. Non-limiting examples of suitable ingredients can include a sugar/sweetener, a flavorant, a preservative (e.g., to prevent yeast or mold growth), a stabilizer, an emulsifier, a prebiotic substance, a special probiotic bacteria, a vitamin, a mineral, an omega 3 fatty acid, a phyto-sterol, an antioxidant, or a colorant, and the like, as well as any mixture or combination thereof.

The additional milk fraction can be a "component-rich fraction," which is meant to encompass any fraction containing at least 15% more of a component of milk (protein, lactose/sugar, fat, minerals) than that found in cow's milk. For instance, a lactose-rich fraction often can contain from about 6 to about 20 wt. % sugar (i.e., in any form, such as lactose, glucose, galactose, etc.), from about 6 to about 18 wt. % sugar, or from about 7 to about 16 wt. % sugar. A mineral-rich fraction can contain from about 1 to about 20 wt. % minerals, from about 1 to about 10 wt. % minerals, or from about 1.5 to about 8 wt. % minerals. A fat-rich fraction often can contain from about 8 to about 50 wt. % fat, from about 20 to about 50 wt. % fat, or from about 30 to about 45 wt. % fat.

These component-rich milk fractions can be produced as described herein or by any technique known to those of skill in the art, such as by membrane filtration processes disclosed in U.S. Pat. Nos. 7,169,428, 9,510,606, and 9,538,770, which are incorporated herein by reference in their entirety. Additionally or alternatively, the component-rich milk fraction (or milk fractions) can be produced by a process comprising mixing water and a powder ingredient (e.g., protein powder, lactose powder, mineral powder, etc.).

Any suitable vessel and conditions can be used for any combining step disclosed herein, and such can be accomplished batchwise or continuously. As an example, the components can be combined in a suitable vessel (e.g., a tank, a silo, etc.) under atmospheric pressure, optionally with agitation or mixing, and optionally with an ingredient (or ingredients) and/or an additional milk fraction (or milk fractions), to form a batch of the finished dairy composition. As another example, the components can be combined continuously in a pipe or other suitable vessel under slight pressure (e.g., 5-50 psig), optionally mixed with ingredients and/or additional milk fractions, and the finished dairy composition can be transferred to a storage tank or filled into containers for retail distribution and sale. Representative systems that can be used for this continuous combining, mixing, and/or packaging can include tetra aldose systems and tetra flexidose systems. Other appropriate methods, systems, and apparatus for combining the components and other ingredients and/or milk fractions are readily apparent from this disclosure.

In one embodiment, for instance, step (iv) can comprise combining, at a minimum, the UF retentate fraction and the mineral concentrate, while in another embodiment, step (iv) can comprise combining, at a minimum, the fat-rich fraction, the UF retentate fraction, and the mineral concentrate. Lactase enzyme can be added to any component or all components prior to the combining step, or lactase enzyme can be added to the resultant dairy composition. As described herein, these components can be combined in any suitable proportions, and optionally, any suitable ingredient and/or additional milk fraction can added in step (iv) to form the dairy composition. Additionally or alternatively, any suitable ingredient and/or additional milk fraction can be added to the dairy composition after the combining step.

Consistent with embodiments of this invention, the UF retentate fraction can be treated with lactase enzyme prior to the combining step, if desired. Likewise, if desired, the mineral concentrate can be treated with lactase enzyme prior to the combining step. Additionally or alternatively, the lactase enzyme can be added during step (iv), or the dairy composition—after step (iv)—can be treated with lactase enzyme. In these circumstances, the lactose content can be reduced to less than about 1 wt. %, less than about 0.5 wt. %, less than about 0.2 wt. %, or less than about 0.1 wt. %.

Optionally, the methods described herein can further comprise a step of microfiltering the milk product (e.g., skim milk) prior to the ultrafiltering step, resulting in a MF permeate fraction and a MF retentate fraction. In such instances, step (i) can comprise ultrafiltering the MF permeate fraction to produce a UF permeate fraction and a UF retentate fraction. Microfiltering can be conducted using microfiltration membranes with relatively large pore sizes that typically are in the 0.1 to 10 micron range, for example, pore sizes in a range from about 0.2 to about 2 μm, or from about 0.1 to about 0.2 μm. In some embodiments, the step of microfiltering utilizes a membrane system having pore sizes in a range from about 0.1 to about 0.2 μm, with operating pressures typically less than about 75 psig (e.g., 10-15 psig) and operating temperatures ranging from about 5 to about 60° C. (or from about 35 to about 55° C.), although not limited thereto.

Often, microfiltration membranes can be used in the dairy industry to remove bacteria, bacterial spores, somatic cells, and other extraneous suspended materials from fluid milk, and therefore improve the quality and shelf-life of the resultant milk product. Microfiltration membranes can be used to separate fat from cheese or cheese whey and to separate milk fat from fluid milks, as an alternative to centrifugal separation. Microfiltration systems also can be used to separate casein proteins of milk from whey proteins of milk. The MF membrane elements can be made from polysulfones (polymeric) or ceramics.

The protein content of the UF retentate fraction often can be at least about 5 wt. %, at least about 6 wt. %, at least about 7 wt. %, at least about 8 wt. %, or at least about 9 wt. % protein. Illustrative and non-limiting ranges for the protein content of the UF retentate can include from about 5 to about 20 wt. % protein, from about 6 to about 18 wt. % protein, or from about 9 to about 15 wt. % protein.

Similarly, while not being limited thereto, the lactose content of the UF permeate fraction and/or the UF retentate fraction generally can be less than or equal to about 7 wt. %, or less than or equal to about 6 wt. %, but greater than or equal to about 3 wt. %, or greater than or equal to about 3.5 wt. %.

The lactose content of the NF retentate fraction can be at least about 6 wt. %, at least about 7 wt. %, at least about 8 wt. %, at least about 9 wt. %, or at least about 10 wt. % lactose, but is not limited thereto. Illustrative and non-limiting ranges for the lactose content of the NF retentate fraction can include from about 6 to about 20 wt. %, from about 6 to about 18 wt. %, from about 7 to about 16 wt. %, from about 8 to about 18 wt. %, or from about 10 to about 16 wt. % lactose. The NF retentate fraction typically contains minimal amounts of protein, typically less than about 1 wt. %, less than about 0.7 wt. %, less than about 0.5 wt. %, or less than about 0.3 wt. % protein.

Moreover, the methods disclosed herein also can further comprise a step of heat treating the dairy composition. In one embodiment, the step of heat treating can comprise pasteurizing at a temperature in a range from about 80° C. to about 95° C. for a time period in a range from less than one minute (e.g., from 3 to 15 seconds) up to about 15 minutes. In another embodiment, the step of heat treating can comprise UHT sterilization at a temperature in a range from about 135° C. to about 145° C. for a time period in a range from about 1 to about 10 seconds. Other appropriate pasteurization or sterilization temperature and time conditions are readily apparent from this disclosure. Further, this invention is not limited by the method or equipment used for performing the pasteurization/sterilization process—any suitable technique and apparatus can be employed, whether operated batchwise or continuously.

In some embodiments of this invention, the methods for making a dairy composition, after a heat treatment step, can further comprise a step of packaging (aseptically or otherwise) the dairy composition in any suitable container and under any suitable conditions. Thus, after combining the various components, ingredients, and additional milk fractions as described herein to form the dairy composition, the dairy composition can be packaged under aseptic conditions (or non-aseptic conditions) in a container. Any suitable container can be used, such as might be used for the distribution and/or sale of dairy products in a retail outlet. Illustrative and non-limiting examples of typical containers include a cup, a bottle, a bag, or a pouch, and the like. The container can be made from any suitable material, such as glass, metal, plastics, and the like, as well as combinations thereof.

While not being limited thereto, the dairy composition can have a protein content of from about 1 to about 15 wt. %, or from about 3 to about 10 wt. %. Additionally or alternatively, the dairy composition can have a fat content of from about 0.05 to about 10 wt. %, or from about 0.1 to about 5 wt. %. Additionally or alternatively, the dairy composition can have a mineral content of from about 0.5 to about 2 wt. %. Additionally or alternatively, the dairy composition can have a lactose content of less than or equal to about 4 wt. %.

A representative and non-limiting example of a dairy composition consistent with this invention can contain less than or equal to about 0.5 wt. % fat, from about 2 to about 15 wt. % protein, from about 0.5 to about 2 wt. % minerals, and less than or equal to about 4 wt. % lactose. Another representative and non-limiting example of a dairy composition consistent with this invention can contain from about 0.5 to about 1.5 wt. % fat, from about 2 to about 15 wt. % protein, from about 0.5 to about 2 wt. % minerals, and less than or equal to about 4 wt. % lactose. Yet, another representative and non-limiting example of a dairy composition consistent with this invention can contain from about 1.5 to about 2.5 wt. % fat, from about 2 to about 15 wt. % protein, from about 0.5 to about 2 wt. % minerals, and less than or equal to about 4 wt. % lactose. Moreover, another representative and non-limiting example of a dairy composition consistent with this invention can contain from about 2.5 to about 5 wt. % fat, from about 2 to about 15 wt. % protein, from about 0.5 to about 2 wt. % minerals, and less than or equal to about 4 wt. % lactose.

Additional non-limiting examples of typical dairy compositions that can be produced by the methods disclosed herein include whole milk, low-fat milk, skim milk, buttermilk, flavored milk, low lactose milk, high protein milk, lactose-free milk, ultra-filtered milk, micro-filtered milk, concentrated milk, evaporated milk, high protein, high calcium, and reduced sugar milk, and the like.

An illustrative and non-limiting example of a suitable separations process consistent with embodiments of this invention is shown in FIG. 1. First, fresh whole milk is separated into cream and a skim milk product. The skim milk product is then subjected to ultrafiltration, such as via a polymeric membrane system, as described herein, resulting in a UF retentate often referred to as a protein-rich milk fraction, and a UF permeate. The UF permeate is then subjected to nanofiltration, resulting in a NF permeate and a NF retentate (which is lactose-rich).

The NF permeate in FIG. 1 is subjected to forward osmosis, resulting in a forward osmosis retentate (mineral concentrate) and a diluted draw solution. The diluted draw solution can be subjected to reverse osmosis or evaporation, resulting in the recovery of a draw solution (which can be used in the forward osmosis step) and water (which can be blended with other components to form a dairy composition).

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

Total solids (wt. %) was determined in accordance with procedure SMEDP 15.10 C by CEM Turbo Solids and Moisture Analyzer (CEM Corporation, Matthews, N.C.). Ash is the residue remaining after ignition in a suitable apparatus at 550° C. to a constant weight; such treatment at 550° C. typically eliminates all organic matter, with the remaining material being primarily minerals (Standard Methods for the examination of dairy products, $17^{th}$ edition (2004), American Public Health Association, Washington D.C.). The ash test was performed by using a Phoenix (CEM Microwave Furnace), which heated the samples at 550° C. for 30 min. The ash content (or mineral content) was determined in wt. %.

Example 1

Example 1 summarizes a series of experiments in which raw milk was separated into cream (a fat-rich fraction) and skim milk, which was subjected to an ultrafiltration step to produce a UF permeate fraction and a UF retentate fraction (a protein-rich fraction), having the respective compositions (concentration ranges) shown in Table I. The UF permeate fraction then was subjected to a nanofiltration step to produce a NF permeate fraction and a NF retentate fraction (a lactose-rich fraction), followed by subjecting the NF permeate fraction to reverse osmosis to produce a RO retentate fraction (a mineral-rich fraction) and a RO permeate fraction (a milk water fraction). In Table I, the mineral content (in wt. %) is generally similar to the ash content (wt. %), and thus the result of an ash test is used for quantification of the total mineral content in this disclosure. For each of the milk fractions in Table I, Table II summarizes the respective Ca, Mg, Na, K, Cl, and P contents (concentration ranges) in ppm by weight.

Specific Ca, Mg, Na, and K contents were determined using a Perkin Elmer Atomic Absorption Spectrophotometer. Samples were treated with trichloroacetic acid to precipitate proteins and the filtrate was analyzed by the Atomic Absorption Spectrophotometer. Phosphorus content was determined via Inductively Coupled Plasma Spectrometry (official method of Analysis of AOAC, International $8^{th}$ edition, methods 965.17 and 985.01). Chlorine content was determined by the official method of analysis of AOAC International $8^{th}$ edition, methods 963.05, 972.27, and 986.26; AOAC International, Gaithersburg, Md. (2005).

Example 2

Similar to Example 1, Example 2 fractionated skim milk using ultrafiltration (to produce a UF permeate fraction and a UF retentate fraction) and nanofiltration of the UF permeate fraction (to produce a NF permeate fraction and a NF retentate fraction) using a GEA Engineering Pilot filtration unit. Then, the NF permeate fraction was subjected to forward osmosis at a temperature of approximately 5° C. and a pressure of 15-25 psig, using a Edema Micro-Pilot unit (Toulouse Cedex 1, France) with an Edema draw solution containing a high concentration of potassium lactate. The membrane used was a spiral wound cellulose triacetate membrane (Edema, France). Table III summarizes the respective compositions of the NF permeate fraction and the FO retentate (the mineral concentrate), while Table IV summarizes the respective Ca, Mg, Na, K, Cl, and P contents in ppm by weight.

Beneficially, the mineral and solids contents were significantly increased with the forward osmosis step. The NF permeate fraction contained 0.198 wt. % minerals and 0.21 wt. % solids, and the FO retentate (the mineral concentrate) contained 2.582 wt. % minerals and 3.89 wt. % solids. This translates to unexpectedly high concentration factors of 13 based on minerals, and 18.5 based on solids. Further, the respective mineral and solids contents of the FO retentate in Table III are about 5 times that of the respective mineral and solids contents of the RO retentate in Table I.

Example 3

In Example 3, a dairy composition was produced having the respective compositions shown in Tables V-VI by blending, at appropriate relative amounts, the UF retentate fraction (see Tables I-II), water, and the FO retentate (mineral concentrate; see Tables III-IV). In similar fashion, a wide variety of dairy compositions can be produced via the methods described herein, having a wide range of fat, protein, lactose, mineral (ash), and total solids contents.

Example 4

Example 4 was performed similarly to that of Example 2, except that the NF permeate fraction was subjected to forward osmosis at a temperature of approximately 10° C. Table VII summarizes the respective compositions of the NF permeate fraction and the FO retentate (the mineral concentrate), while Table VIII summarizes the respective Ca, Mg, Na, K, Cl, and P contents in ppm by weight.

Beneficially, the mineral and solids contents were significantly increased with the forward osmosis step. The NF permeate fraction contained 0.149 wt. % minerals and 0.19 wt. % solids, and the FO retentate (the mineral concentrate) contained 6.48 wt. % minerals and 9.26 wt. % solids. This translates to unexpectedly high concentration factors of 43 based on minerals, and 48 based on solids. Further, the respective mineral and solids contents of the FO retentate in Table VII are about 10-15 times that of the respective mineral and solids contents of the RO retentate in Table I.

TABLE I

Summary of Example 1 compositions.

| | Fat (wt. %) | Protein (wt. %) | Lactose (wt. %) | Minerals (wt. %) | Total solids (wt. %) |
|---|---|---|---|---|---|
| Raw milk | 3.5-4.0 | 3.0-3.5 | 4.7-5.0 | 0.70-0.80 | 12.30-12.50 |
| Cream | 40-45 | 1.7-2.0 | 2.0-3.0 | 0.3-0.4 | 45-48 |

TABLE I-continued

Summary of Example 1 compositions.

| | Fat (wt. %) | Protein (wt. %) | Lactose (wt. %) | Minerals (wt. %) | Total solids (wt. %) |
|---|---|---|---|---|---|
| Skim milk | 0.08-0.2 | 3.1-3.6 | 4.75-5.05 | 0.75-0.85 | 9.0-9.2 |
| UF retentate | 0.3-0.4 | 10-20 | 4.5-5.0 | 1.3-1.6 | 16-20 |
| UF permeate | 0 | 0.15-0.25 | 4-5 | 0.4-0.6 | 5-6 |
| NF retentate | 0.1 | 0.18-0.40 | 10-14 | 0.8-0.9 | 11-15 |
| NF permeate | 0 | 0 | 0.07-0.10 | 0.2-0.3 | 0.3-0.5 |
| RO retentate | 0 | 0.01-0.05 | 0.1-0.3 | 0.4-0.6 | 0.8-0.9 |
| RO permeate | 0 | 0 | 0 | 0.03-0.04 | 0.04-0.06 |

TABLE II

Summary of Example 1 mineral compositions.

| | Calcium (ppm) | Magnesium (ppm) | Sodium (ppm) | Potassium (ppm) | Chloride (ppm) | Phosphorus (ppm) |
|---|---|---|---|---|---|---|
| Raw milk | 1210-1250 | 100-120 | 380-420 | 1600-1620 | 730-750 | 1000-1020 |
| Cream | 550-570 | 50-70 | 220-240 | 880-900 | 590-610 | 540-560 |
| Skim milk | 1240-1260 | 110-130 | 380-420 | 1610-1630 | 950-970 | 1000-1020 |
| UF retentate | 3300-3400 | 220-230 | 460-480 | 1810-1830 | 940-960 | 2230-2250 |
| UF permeate | 460-500 | 60-70 | 390-410 | 1480-1500 | 960-965 | 480-500 |
| NF retentate | 870-900 | 150-170 | 540-560 | 2160-2180 | 710-730 | 940-960 |
| NF permeate | 50-100 | <10 | 230-250 | 980-1000 | 1060-1080 | 50-70 |
| RO retentate | 160-200 | 20-40 | 860-880 | 3720-3740 | 4110-4130 | 170-190 |
| RO permeate | 0 | 0 | 20-30 | 30-40 | 50-60 | 0 |

TABLE III

Summary of Example 2 compositions.

| | Fat (wt. %) | Protein (wt. %) | Lactose (wt. %) | Minerals (wt. %) | Total solids (wt. %) |
|---|---|---|---|---|---|
| NF permeate | ND | 0.09 | ND | 0.198 | 0.21 |
| FO retentate | 0.16 | 0.41 | 0.80 | 2.582 | 3.89 |

TABLE IV

Summary of Example 2 mineral compositions.

| | Calcium (ppm) | Magnesium (ppm) | Sodium (ppm) | Potassium (ppm) | Chloride (ppm) | Phosphorus (ppm) |
|---|---|---|---|---|---|---|
| NF permeate | 30 | <10 | 180 | 800 | 96 | <40 |
| FO retentate | 280 | 40 | 2150 | 9470 | 1090 | 272 |

ND = not detected

TABLE V

Summary of Example 3 mineral compositions.

| | Quantity (g) | Fat (wt. %) | Protein (wt. %) | Lactose (wt. %) | Minerals (wt. %) | Total solids (wt. %) |
|---|---|---|---|---|---|---|
| UF retentate (skim) | 1759 | 0.45 | 12.71 | 5.63 | 1.46 | 18.81 |
| FO retentate (mineral concentrate) | 1024 | 0.16 | 0.41 | 0.80 | 2.58 | 3.89 |

TABLE V-continued

Summary of Example 3 mineral compositions.

|  | Quantity (g) | Fat (wt. %) | Protein (wt. %) | Lactose (wt. %) | Minerals (wt. %) | Total solids (wt. %) |
|---|---|---|---|---|---|---|
| Filtered Water | 1214 | ND | ND | ND | ND | ND |
| Dairy Composition | 3997 | 0.21 | 5.64 | 2.49 | 0.80 | 8.51 |

TABLE VI

Summary of Example 3 mineral compositions.

|  | Calcium (ppm) | Magnesium (ppm) | Sodium (ppm) | Potassium (ppm) | Chloride (ppm) | Phosphorus (ppm) |
|---|---|---|---|---|---|---|
| UF retentate (skim) | 3500 | 210 | 450 | 1720 | 960 | 2500 |
| FO retentate (mineral concentrate) | 280 | 40 | 2150 | 9470 | 1090 | 272 |
| Filtered Water | ND | ND | ND | ND | ND | ND |
| Dairy Composition | 1600 | 10 | 248 | 2085 | 698 | 1140 |

ND = not detected

TABLE VII

Summary of Example 4 compositions.

|  | Fat (wt. %) | Protein (wt. %) | Lactose (wt. %) | Minerals (wt. %) | Total solids (wt. %) |
|---|---|---|---|---|---|
| NF permeate | 0.03 | 0.01 | ND | 0.149 | 0.19 |
| FO retentate | 0.14 | 0.56 | 2.08 | 6.48 | 9.26 |

TABLE VIII

Summary of Example 4 mineral compositions.

|  | Calcium (ppm) | Magnesium (ppm) | Sodium (ppm) | Potassium (ppm) | Chloride (ppm) | Phosphorus (ppm) |
|---|---|---|---|---|---|---|
| NF permeate | 48 | 20 | 255 | 899 | 770 | <40 |
| FO retentate | 400 | 90 | 5690 | 23800 | 2410 | 360 |

ND = not detected

We claim:

1. A method for making a dairy composition, the method comprising:
   (i) ultrafiltering a milk product to produce an ultrafiltration (UF) permeate fraction and an ultrafiltration (UF) retentate fraction;
   (ii) nanofiltering the UF permeate fraction to produce a nanofiltration (NF) permeate fraction and a nanofiltration (NF) retentate fraction;
   (iii) subjecting the NF permeate fraction to a forward osmosis step to produce a mineral concentrate; and
   (iv) combining at least the UF retentate fraction and the mineral concentrate to form the dairy composition, or combining at least a fat-rich fraction, the UF retentate fraction, and the mineral concentrate to form the dairy composition;
   wherein the mineral concentrate comprises from about 1.5 to about 9 wt. % minerals and from about 1 to about 30 wt. % solids.

2. The method of claim 1, wherein:
   the method further comprises a step of separating a raw milk into the milk product and the fat-rich fraction; and
   the milk product comprises skim milk.

3. The method of claim 2, wherein the combining further comprises adding water to form the dairy composition.

4. The method of claim 1, wherein:
   the (iii) comprises subjecting the NF permeate fraction to the forward osmosis step to produce the mineral concentrate and a diluted draw solution; and
   the method further comprises (v) removing at least a portion of water from the diluted draw solution to form a draw solution.

5. The method of claim 4, wherein the removing at least a portion of water from the diluted draw solution comprises subjecting the diluted draw solution to evaporation or reverse osmosis.

6. The method of claim 1, wherein:
   the UF retentate fraction is treated with lactase enzyme prior to the combining; and/or
   the mineral concentrate is treated with lactase enzyme prior to the combining.

7. The method of claim 1, wherein the dairy composition has:
   a fat content of from about 0.05 to about 10 wt. %;
   a protein content of from about 1 to about 15 wt. %;
   a mineral content of from about 0.5 to about 2 wt. %; and
   a lactose content of less than or equal to about 4 wt. %.

8. The method of claim 1, wherein the combining further comprises addition of an ingredient, wherein the ingredient comprises a sugar/sweetener, a flavorant, a preservative, a stabilizer, an emulsifier, a prebiotic substance, a special probiotic bacteria, a vitamin, a mineral, an omega 3 fatty acid, a phyto-sterol, an antioxidant, a colorant, or any combination thereof.

9. The method of claim 1, wherein:
the method further comprises a step of heat treating the dairy composition; and
heat treating comprises ultra-high temperature (UHT) sterilization at a temperature in a range from about 135° C. to about 145° C. for a time period in a range from about 1 to about 10 seconds, or pasteurizing at a temperature in a range from about 80° C. to about 95° C. for a time period in a range from about 2 to about 15 minutes.

10. The method of claim 1, wherein the mineral concentrate comprises:
from about 2 to about 8 wt. % minerals.

11. The method of claim 1, wherein the forward osmosis step is conducted at a pressure of less than or equal to about 30 psig.

12. The method of claim 1, wherein the forward osmosis step is conducted at a temperature in a range from about 5 to about 15° C.

13. The method of claim 1, wherein the forward osmosis step is conducted at a concentration factor of at least about 3 and less than or equal to about 100, based on wt. % minerals.

14. The method of claim 1, wherein a wt. % solids content of the mineral concentrate is from about 3 to about 20 times the wt. % solids content of a reverse osmosis (RO) retentate fraction obtained by subjecting an otherwise equivalent NF permeate fraction to a reverse osmosis step.

15. The method of claim 1, wherein a wt. % minerals content of the mineral concentrate is from about 3 to about 20 times the wt. % minerals content of a reverse osmosis (RO) retentate fraction obtained by subjecting an otherwise equivalent NF permeate fraction to a reverse osmosis step.

16. The method of claim 1, wherein the forward osmosis step utilizes a forward osmosis draw solution comprising sodium, potassium, chloride, or a combination thereof.

17. The method of claim 1, wherein the forward osmosis step utilizes a forward osmosis draw solution comprising sucrose, glucose, galactose, lactose, fructose, maltose, or a combination thereof.

18. The method of claim 1, wherein the forward osmosis step utilizes a forward osmosis draw solution comprising potassium lactate.

19. The method of claim 1, wherein the forward osmosis step utilizes a forward osmosis draw solution comprising milk minerals.

20. A method for making a dairy composition, the method comprising:
(i) ultrafiltering a milk product to produce an ultrafiltration (UF) permeate fraction and an ultrafiltration (UF) retentate fraction;
(ii) nanofiltering the UF permeate fraction to produce a nanofiltration (NF) permeate fraction and a nanofiltration (NF) retentate fraction;
(iii) subjecting the NF permeate fraction to a forward osmosis step to produce a mineral concentrate, wherein the forward osmosis step is conducted at a concentration factor of at least about 3 and less than or equal to about 100, based on wt. % minerals; and
(iv) combining at least the UF retentate fraction and the mineral concentrate to form the dairy composition, or combining at least a fat-rich fraction, the UF retentate fraction, and the mineral concentrate to form the dairy composition.

21. The method of claim 20, wherein the forward osmosis step is conducted at a pressure of less than or equal to about 30 psig.

22. The method of claim 20, wherein the forward osmosis step is conducted at a temperature in a range from about 5 to about 15° C.

23. The method of claim 20, wherein the forward osmosis step is conducted using a membrane system having pore sizes of less than or equal to 0.001 μm.

24. A method for making a dairy composition, the method comprising:
(i) ultrafiltering a milk product to produce an ultrafiltration (UF) permeate fraction and an ultrafiltration (UF) retentate fraction;
(ii) nanofiltering the UF permeate fraction to produce a nanofiltration (NF) permeate fraction and a nanofiltration (NF) retentate fraction;
(iii) subjecting the NF permeate fraction to a forward osmosis step to produce a mineral concentrate, wherein the forward osmosis step utilizes a forward osmosis draw solution comprising milk minerals; and
(iv) combining at least the UF retentate fraction and the mineral concentrate to form the dairy composition, or combining at least a fat-rich fraction, the UF retentate fraction, and the mineral concentrate to form the dairy composition.

25. The method of claim 24, wherein:
the milk product comprises skim milk; and
the combining further comprises adding water to form the dairy composition.

26. The method of claim 25, wherein the combining further comprises adding an ingredient to form the dairy composition.

\* \* \* \* \*